United States Patent
Sato

(10) Patent No.: US 10,481,532 B2
(45) Date of Patent: *Nov. 19, 2019

(54) IMAGE PROCESSING SYSTEM FOR FORMING AN IMAGE ON A SHEET USING A DECOLORABLE COLORING MATERIAL

(71) Applicants: KABUSHIKI KAISHA TOSHIBA, Tokyo (JP); TOSHIBA TEC KABUSHIKI KAISHA, Tokyo (JP)

(72) Inventor: Naoya Sato, Atami Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/159,168

(22) Filed: Oct. 12, 2018

(65) Prior Publication Data

US 2019/0041781 A1    Feb. 7, 2019

Related U.S. Application Data

(63) Continuation of application No. 15/672,596, filed on Aug. 9, 2017, now Pat. No. 10,126,690.

(30) Foreign Application Priority Data

Sep. 21, 2016 (JP) .................. 2016-183764

(51) Int. Cl.
*G03G 15/00* (2006.01)
*G03G 15/20* (2006.01)
(Continued)

(52) U.S. Cl.
CPC ......... *G03G 15/2039* (2013.01); *B41M 7/009* (2013.01); *B41M 7/0009* (2013.01);
(Continued)

(58) Field of Classification Search
CPC .................................................. G03G 21/02
(Continued)

(56) References Cited

U.S. PATENT DOCUMENTS 9,036,201 B2   5/2015  Hagiwara
9,199,500 B1   12/2015  Umetsu
(Continued)

FOREIGN PATENT DOCUMENTS

| JP | 2011-257903 A | 12/2011 |
| JP | 2012-252312 A | 12/2012 |
| JP | 2015-179220 A | 10/2015 |

OTHER PUBLICATIONS

Extended European Search Report dated Nov. 24, 2017, filed in counterpart European Patent Application No. 17189347.2 (12 pages).

*Primary Examiner* — William J Royer
(74) *Attorney, Agent, or Firm* — Kim & Stewart LLP

(57) ABSTRACT

According to an embodiment, an image processing system includes an image forming unit, a decoloring unit, a storage device, an operation panel and a processor. The storage device stores image data of a plurality of printed materials. The processor forms on a sheet an image based on image data in a page range of the printed material received by the operation panel. The processor determines whether or not images of all pages in the page range have been decolored in a predetermined range after the image formation is executed when the formed image is decolored by the decoloring unit.

20 Claims, 14 Drawing Sheets

(51) Int. Cl.
  *G06F 3/041* (2006.01)
  *G06K 15/16* (2006.01)
  *H04N 1/12* (2006.01)
  *H04N 1/32* (2006.01)
  *B41M 7/00* (2006.01)
  *G03G 21/00* (2006.01)
  *G03G 21/02* (2006.01)
  *G07F 17/00* (2006.01)
  *G07F 17/26* (2006.01)
  *G03G 15/36* (2006.01)
  *G06F 3/12* (2006.01)
  *H04N 1/00* (2006.01)
  *H04N 1/38* (2006.01)

(52) U.S. Cl.
  CPC .......... *G03G 21/00* (2013.01); *G03G 21/02* (2013.01); *G06F 3/041* (2013.01); *G06K 15/16* (2013.01); *G07F 17/005* (2013.01); *G07F 17/266* (2013.01); *H04N 1/121* (2013.01); *H04N 1/32101* (2013.01); *B41M 2205/18* (2013.01); *G03G 15/36* (2013.01); *G06F 3/1219* (2013.01); *G06F 3/1273* (2013.01); *H04N 1/00832* (2013.01); *H04N 1/38* (2013.01)

(58) Field of Classification Search
  USPC .......................................... 399/79, 82, 341
  See application file for complete search history.

(56) References Cited

U.S. PATENT DOCUMENTS

| | | | |
|---|---|---|---|
| 9,207,606 B2 | 12/2015 | Shinohara | |
| 9,487,042 B2 | 11/2016 | Hiyoshi | |
| 10,126,690 B2 * | 11/2018 | Sato | ............ G07F 17/266 |
| 2002/0062274 A1 | 5/2002 | Tamayama et al. | |
| 2009/0086244 A1 | 4/2009 | Matoba | |
| 2011/0292419 A1 | 12/2011 | Shibuya | |
| 2012/0306985 A1 | 12/2012 | Iguchi et al. | |
| 2014/0193169 A1 | 7/2014 | Shinohara | |
| 2016/0088192 A1 | 3/2016 | Mizuno | |

* cited by examiner

IMAGE PROCESSING SYSTEM FOR FORMING AN IMAGE ON A SHEET USING A DECOLORABLE COLORING MATERIAL

CROSS-REFERENCE TO RELATED APPLICATION

This application is a continuation of U.S. patent application Ser. No. 15/672,596, filed on Aug. 9, 2017, which application is based upon and claims the benefit of priority from the prior Japanese Patent Application No. 2016-183764, filed on Sep. 21, 2016, the entire contents of which are incorporated herein by reference.

FIELD

An embodiment described herein generally relates to an image processing system which includes an image forming apparatus which forms images on sheets by using a decolorable coloring material, and a decoloring apparatus which decolors the images on the sheets.

BACKGROUND

Image processing systems which each reuse sheets by using an image forming apparatus which forms images on sheets by a decolorable coloring material, and a decoloring apparatus which decolors the images of the sheets are known. Further, the decoloring apparatus reads images of sheets before decoloring the images.

Meanwhile, the image processing systems usually receive payment of predetermined fees from users and rent published books for a certain period of time.

DETAILED DESCRIPTION

Figure 1:
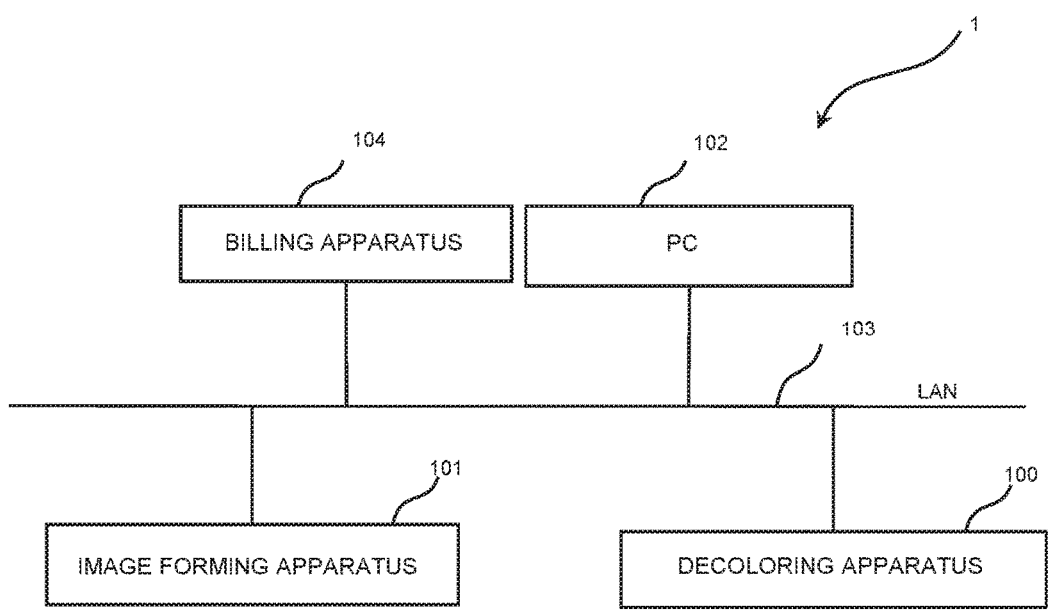
FIG. 1 is a view illustrating an image processing system according to an embodiment.

According to one embodiment, an image processing system includes an image forming unit, an image decoloring unit, a storage device, an operation panel and a processor.

The image forming unit forms an image on a sheet by using a decolorable coloring material. The image decoloring unit decolors the image formed by the image forming unit. The storage device stores book information including print data of a plurality of books which can be printed by the image forming unit. The operation panel receives designation of a page range of each of the books which need to be printed by the image forming unit. The processor obtains the print data corresponding to the page range of each of the books designated by the operation panel from the storage device. The processor causes the image forming unit to form on the sheet the images based on the obtained print data of each of the books. Further, when the image formed by the image forming unit is decolored by the image decoloring unit, the processor determines whether or not images of all pages in the page range have been decolored by the image decoloring unit in a predetermined period after image formation is executed by the image forming unit.

The image processing system according to the embodiment stores data of a published book in a printable format in advance. Data such as a book stored in a printable format will be referred to as book print data below. The image processing system creates a printed material of the book by forming images of a book desired by a user (referred to the user below) who receives service, on sheets by using decolorable coloring materials. Forming images of a book by using decolorable coloring materials and creating a printed material of the book will be simply referred to as print processing. The image processing system rents the printed material of the book to the user for a limited period of time. Further, when renting the printed material of the book, the image processing system starts print processing of the book when a fee (price) defined in advance is paid. The image processing system handles this predetermined fee not only as a price for renting but also as a deposit.

The image processing system according to the embodiment decolors images formed on sheets of a printed material by heating the sheets of the printed material at a predetermined temperature or more when the rented printed material is returned. Further, when the printed material is returned, and when all pages (sheets) of the printed material are returned in the predetermined period (deadline), the image processing system refunds part or entirety of the paid fee (price). Similarly, when part of pages of the printed material are returned on or before the deadline, the image processing system refunds part of the paid fee (price) according to the number of returned pages of the printed material. The image processing system determines whether or not the image decoloring unit decolors all pages which are formed by the image forming unit and are in the page range designated by the user within the predetermined period after performing image formation processing.

The image processing system according to the embodiment encourages the user to return a printed material which is the same as a book and is temporarily rented by causing the user to pay the deposit in advance. Further, the image processing system can prevent unauthorized external leakage of contents of the book by decoloring contents and information of the rented printed material, and reuse the sheets. In this regard, there is a case that a cause that sheets of the returned printed material include writing which cannot be decolored or bends makes it impossible to reuse the sheets. Even in this case, if the user returns the sheets (printed material) on which the images are formed within the predetermined period, the image processing system regards that the printed material is returned.

Further, the image forming apparatus according to the embodiment which performs printing by using decolorable coloring materials will be described. However, the image forming apparatus may perform printing by using decolorable coloring materials and printing by using non-decolorable coloring materials. The decolorable coloring material decolors a sheet by being heated at a predetermined fixing temperature or more and being fixed to a sheet or by being heated at a temperature equal to or more than a predetermined decoloring temperature equal to or more than the fixing temperature. The decolorable coloring material includes a coloring compound, a developer and a decoloring agent. The coloring compound is, for example, a leuco dye. The developer is, for example, phenols. The decoloring agent is a material which becomes compatible with the coloring compound when heated, and does not have affinity with the developer. The decolorable coloring material which develops a color as a result of an interaction of the coloring compound and the developer, and decolors images since the interaction of the coloring compound and the developer stops working when the coloring material is heated at the decoloring temperature or more.

In this regard, toner is used as an example of a coloring material in the embodiment. However, image formation processing may be performed by using inks as coloring materials. "Decoloring" in the embodiment means to make visually invisible an image formed by using a color (including not only chromatic colors but also achromatic colors such as white and black) different from an underlayer color of a sheet. "To make visually invisible" may include making colorless (transparent) an image formed by using a color different from an underlayer color of a sheet, and changing a color of the image formed by using a color different from the underlayer color of the sheet to a color which is the same as or similar to the underlayer color of the sheet.

The embodiment will be described below with reference to the drawings. In the drawings, the same reference numerals indicate the same or similar portions. FIG. 1 is a view illustrating an example of an image processing system according to the embodiment. An image processing system 1 includes a decoloring apparatus 100, an image forming apparatus 101, a PC 102 (PC: Personal computer) and a billing apparatus 104. The apparatuses 100 to 102 and 104 of the image processing system 1 are connected by a LAN (Local Area Network) cable 103. A network device such as a switching hub may be connected between the apparatuses 100 to 102 and 104 and the LAN cable 103. Further, the apparatuses 100 to 102 and 104 may be connected by connection other than connection using the LAN, and may be partially connected via the Internet or may be connected by a WAN (Wide Area Network).

The image forming apparatus 101 forms an image on a sheet by using decoloring toner. As described above, the decoloring toner decolors a sheet when heated at a higher temperature (decoloring temperature) than a temperature (fixing temperature) for fixing an image to a sheet. The image forming apparatus 101 has a function of printing a page range designated by the user in a book designated by the user. In this case, the image forming apparatus 101 allocates to each page a code (indicating, for example, a bar code indicating management information) obtained by converting the management information for renting a printed material of a book described below and prints each page.

The PC 102 associates and stores identification information (ID) of a book provided to the user, a title, actual image data of a book (print data of the book). Further, the PC 102 stores a book unit prices and price information of each page, in association with book identification information.

The PC 102 transmits print data of the book designated by the user to the image forming apparatus 101 via the LAN cable 103. In this case, the PC 102 associates and stores data of a print date and the book identification information. The PC 102 stores at least information including data of the print date as the management information, and transmits the information to the decoloring apparatus 100.

The decoloring apparatus 100 heats, at a decoloring temperature, sheets on which images of a printed material are formed by using decoloring toner. Thus, the decoloring apparatus 100 decolors the images of the printed material formed on the sheets. Further, the decoloring apparatus 100 reads each bar code formed on each sheet before decolor processing, and obtains the management information. The decoloring apparatus 100 determines whether or not the images of all pages of the printed material have been decolored (whether or not the printed material has been returned) within a predetermined period according to this management information. Further, the decoloring apparatus 100 displays page numbers of a printed material which are not decolored (page numbers of a printed material which are not returned) during decolor processing (printed material return processing), and encourages the user to return the printed material rented to the user.

The billing apparatus 104 is an apparatus which receives a fee (payment) paid by the user, and returns (refunds) the fee to the user. The billing apparatus 104 includes a payment slot for coins and bills, a stack unit which accommodates the coins and the bills and a withdrawal slot which returns the fee to the user. The billing apparatus 104 receives a billing amount (fee) of a book provided to the user from the PC 102, and determines whether or not the user has paid this billing amount. Further, the billing apparatus 104 includes a display which displays a paid money amount and, when the paid money amount includes a lacking money amount with respect to a predetermined fee, displays the money amount corresponding to the lacking money amount.

Figure 2:
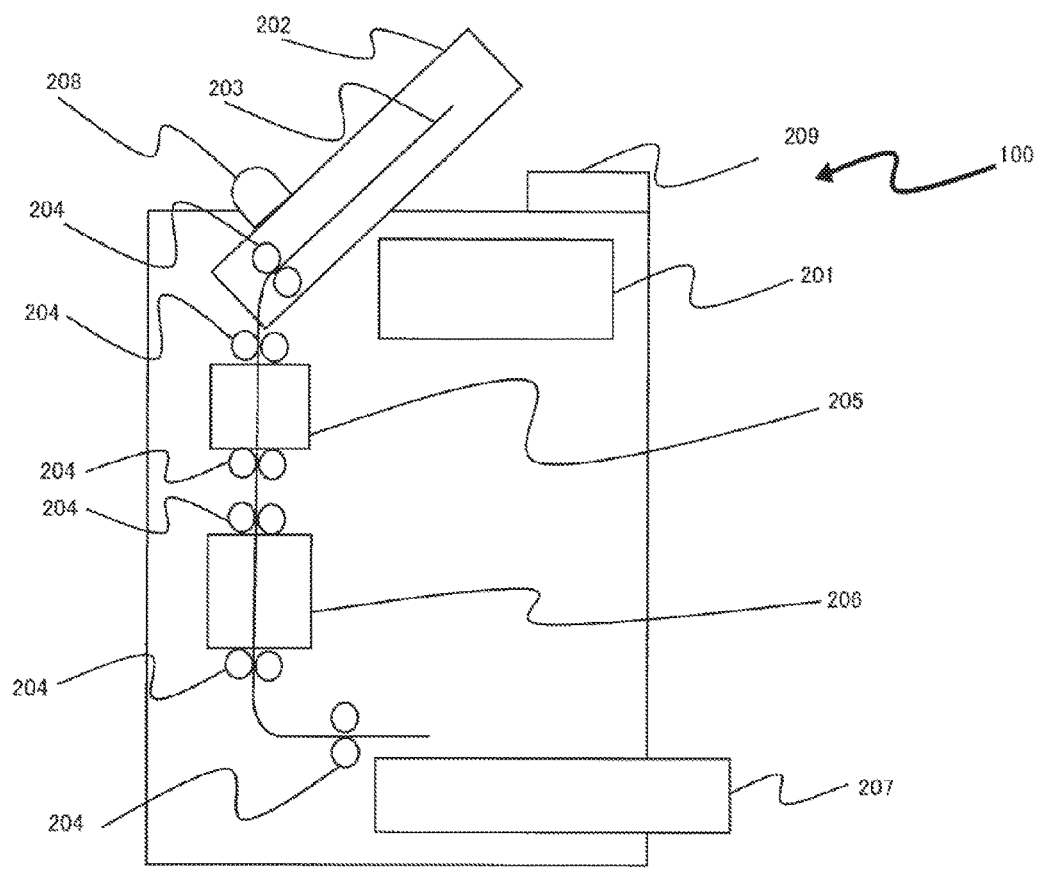
FIG. 2 is a cross-sectional view illustrating a decoloring apparatus according to the embodiment.

FIG. 2 is a cross-sectional view schematically illustrating the decoloring apparatus 100 according to the embodiment. The decoloring apparatus 100 includes a controller 201, a sheet feeding unit 202, a convey path 203, convey rollers 204, a reading unit 205, an image decoloring unit 206, a sheet ejection unit 207, a sensor 208 and a card reading unit 209.

The sheet feeding unit 202 includes a tray on which a rented printed material (sheet bundle) is stacked. The sensor 208 is disposed on a stacking surface of the tray of the sheet feeding unit 202. The sensor 208 detects whether or not sheets are in the sheet feeding unit 202.

The convey path 203 and the convey rollers 204 feed the sheets stacked in the sheet feeding unit 202 one by one to a housing of the decoloring apparatus 100 under control of the controller 201. Further, the convey path 203 and the convey rollers 204 convey the sheets to the reading unit 205, the image decoloring unit 206 and the sheet ejection unit 207 in order in the housing.

The reading unit 205 includes a CCD (Charge-Coupled Device) image sensor and a light emitting device, and scans a surface of a sheet to be conveyed and reads an image on the sheet surface. The reading unit 205 outputs image data corresponding to the image on the read sheet surface to the controller 201. The controller 201 causes a memory to store the image data. Further, the controller 201 specifies a bar code area from the image of the sheet surface, and obtains the management information from the bar code.

The image decoloring unit 206 includes a heating body such as a heater which heats the printed sheet by using the decoloring toner, and decolors the image. The sheet ejection unit 207 includes a cassette on which decolored sheets are stacked.

The card reading unit 209 includes a card reader/writer which can perform near field communication such as communication by using a RFID (Radio frequency identifier) tag, and reads a card without contacting the card. The card reading unit 209 functions as a billing unit, which is used to perform a procedure of receiving a user's paid fee (payment) and refunding the fee (withdrawal) to the user. That is, the card reading unit 209 reads the card on which the money amount can be charged in advance and which is possessed by the user, and writes in the card the money amount from which a payment amount is subtracted or a money amount to which a refund amount is added. In this regard, a settlement procedure such as payment and refund is not limited to use of the card, and may be a procedure which uses a mobile telephone which can execute settlement.

Figure 3:
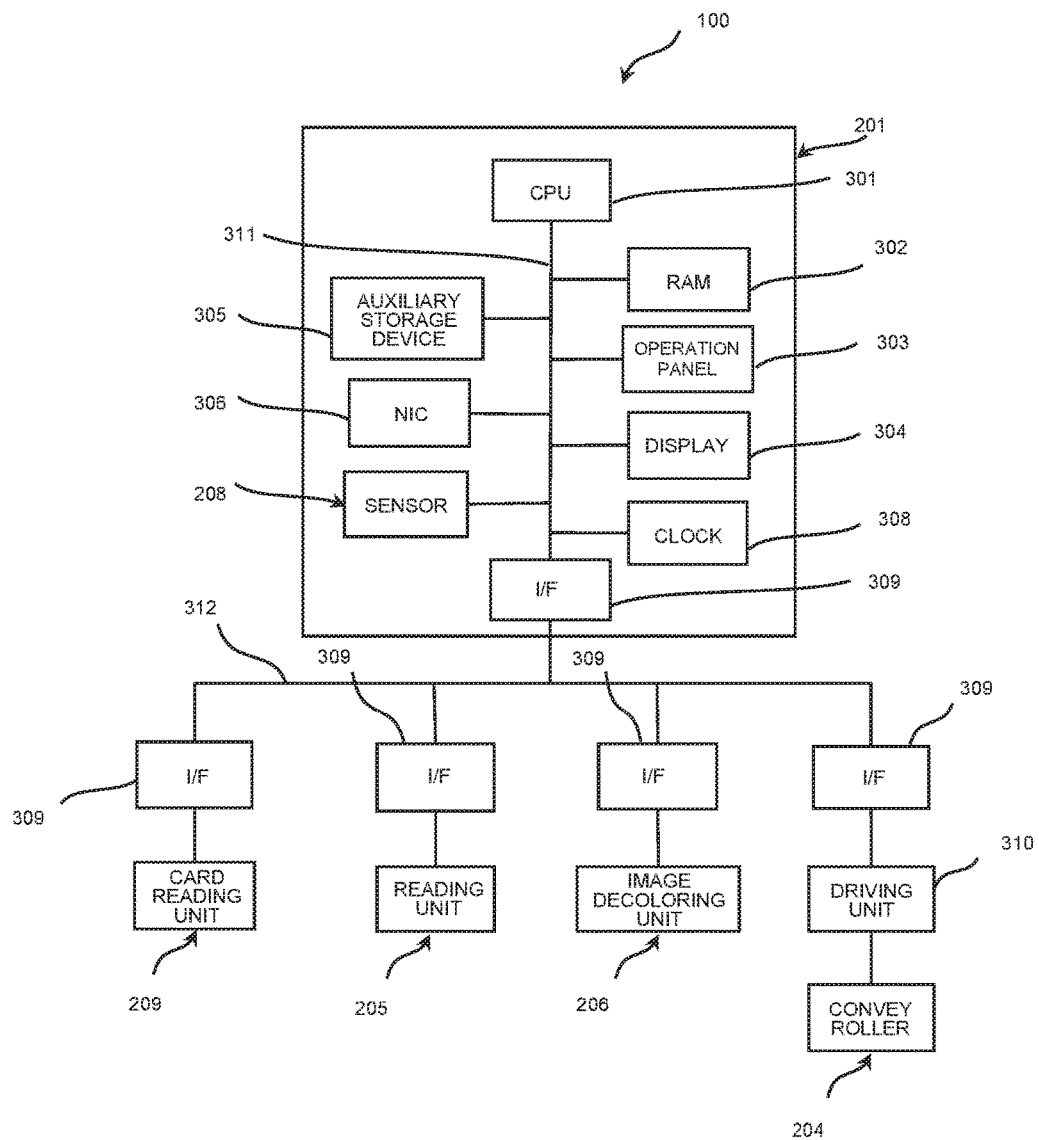
FIG. 3 is a block diagram illustrating the decoloring apparatus according to the embodiment.

FIG. 3 is a block diagram illustrating the decoloring apparatus 100 according to the embodiment. The controller 201 of the decoloring apparatus 100 includes a processor 301, a RAM (Random Access Memory) 302, an operation panel 303, a display 304, an auxiliary storage device 305, a NIC (Network Interface Card) 306, the sensor 208, a clock 308 and an I/F (interface) 309. The processor 301 is, for example, a CPU (Central Processing Unit). The processor 301 will be simply referred to as the CPU 301 below. The CPU 301 integrally controls hardware in the device according to programs stored in advance in the auxiliary storage device 305. The CPU 301 includes the RAM 302, the operation panel 303, the display 304, the auxiliary storage device 305, the NIC 306, the sensor 208, the clock 308 and the I/F (interface) 309 via a system bus 311.

The RAM 302 is a memory which stores data in a volatile memory and directly exchanges data with the CPU 301. The auxiliary storage device 305 is a memory which stores data in a non-volatile manner, and permanently stores programs and parameters. The display 304 notifies the user of messages. The operation panel 303 includes physical buttons, and a touch panel stacked and disposed on the display 304.

The NIC 306 connects with the LAN cable 103, and performs communication control to receive information from an outside (e.g., the PC 102) and transmits a processing result to the outside. The clock 308 includes a clock generation circuit, and counts a time.

The I/F 309 is connected with a communication cable 312. The CPU 301 communicates with the card reading unit 209, the reading unit 205, the image decoloring unit 206 and a driving unit 310 for the convey rollers 204 via the I/F 309 and the communication cable 312. The I/F 309 and the communication cable 312 may be a USB (Universal Serial Bus) interface and a cable. The driving unit 310 controls rotation of the convey rollers 204. The driving unit 310 may include a general motor and a control device of the motor. The convey rollers 204 are connected with the driving unit 310 via a gear and a shaft, for example, and rotates when receiving power from the driving unit 310.

Figure 4:
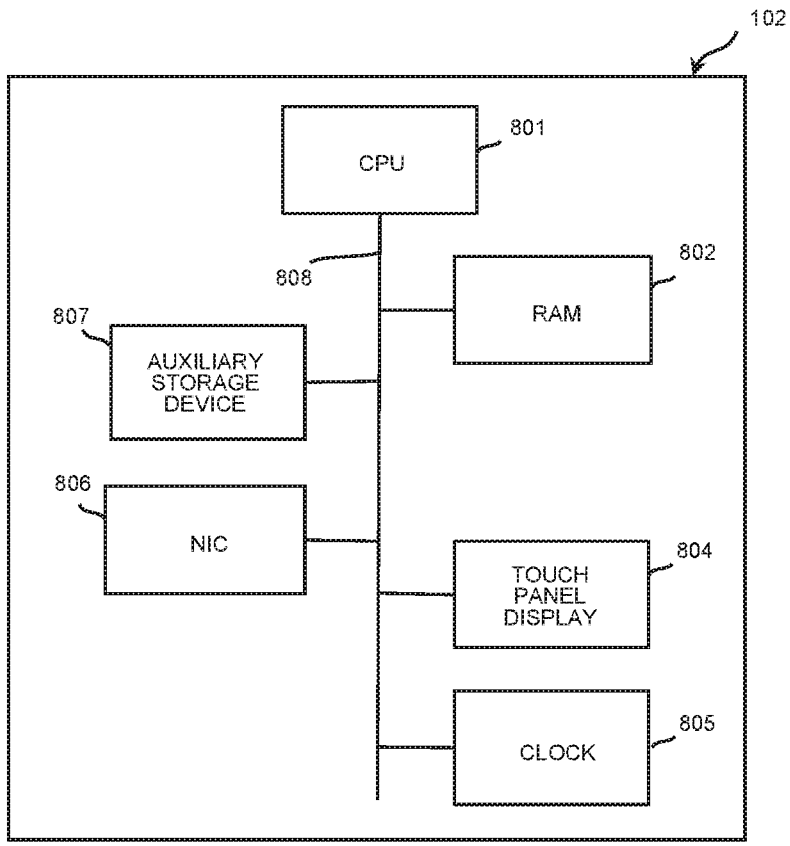
FIG. 4 is a block diagram illustrating a personal computer according to the embodiment.

FIG. 4 is a block diagram illustrating an example of the PC 102. The PC 102 employs the same configuration as that of a personal computer or a server which is conventionally known. That is, the PC 102 includes a processor (CPU) 801, a RAM 802, a NIC 806 and an auxiliary storage device 807. Further, the PC 102 includes a touch panel display 804 which includes a display and an operation unit, and a clock 805. Each of these units 801, 802 and 804 to 807 is connected via a system bus 808. Further, each of the units 801, 802 and 804 to 808 has the same function as that of each of units 301 to 306, 308 and 311 of the decoloring apparatus 100 in FIG. 3, and therefore will not be described.

Figure 5:
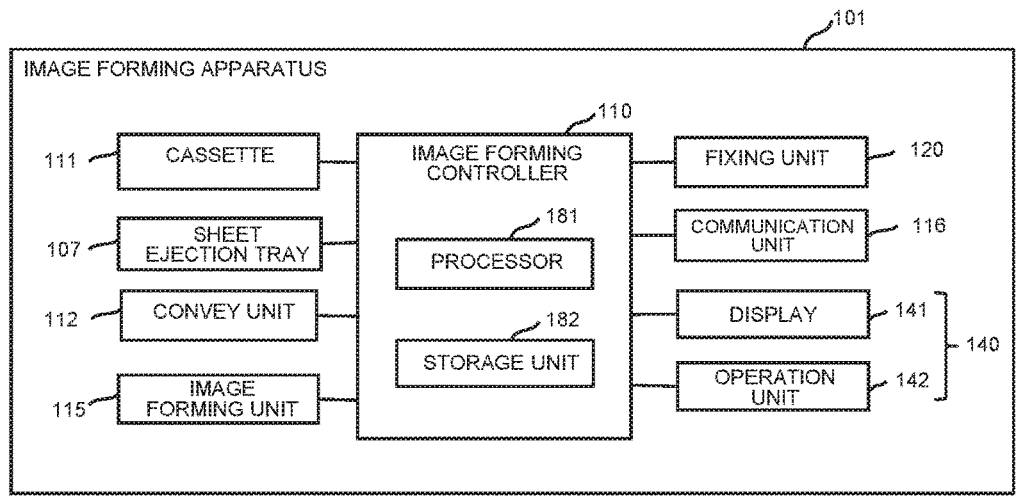
FIG. 5 is a block diagram illustrating an image forming apparatus according to the embodiment.

FIG. 5 is a block diagram illustrating the image forming apparatus 101 according to the embodiment. The image forming apparatus 101 includes an image forming controller 110 which includes a processor 181 and a storage unit 182. The processor 181 is an arithmetic operation processing device such as a CPU. The processor 181 realizes various functions by executing programs stored in the storage unit 182. The storage unit 182 is a main storage device which stores data in a volatile manner, and directly inputs and outputs data to and from the processor 181. Further, the storage unit 182 includes a ROM or an auxiliary storage device which stores programs and data in a volatile manner. According to this configuration, the image forming controller 110 integrally controls each unit of the image forming apparatus 101.

The image forming apparatus 101 includes a communication unit 116. The communication unit 116 includes a NIC, receives print data from the PC 102 based on an instruction of the image forming controller 110, and returns information related to a processing result and a status to the transmission source PC 102.

The image forming apparatus 101 includes a cassette 111 and a sheet ejection tray 107. The cassette 111 accommodates a plurality of used sheets. The image forming apparatus 101 feeds sheets from the cassette 111 to an inside of a main body. The sheet ejection tray 107 is an ejection destination of sheets on which images are formed by using decoloring toner. Further, the image forming apparatus 101 includes an image forming unit 115 and a fixing unit 120. The image forming unit 115 forms an image corresponding to print data transmitted from the PC 102 on the sheet fed from the cassette 111 by using the decoloring toner. That is, the image forming unit 115 is a unit which forms a decolorable image. In other words, the image forming unit 115 is a unit which creates a decolorable printed material of a book. The fixing unit 120 includes a heating body, and uses this heating body to heat the sheet on which the image (the image formed by using the decoloring toner) has been formed at a predetermined fixing temperature and fix the image to the sheet.

The image forming apparatus 101 includes an operation panel 140. The operation panel 140 includes a display 141 and an operation unit 142 The display 141 is, for example, a flat liquid crystal monitor. The operation unit 142 includes physical buttons, and a touch panel stacked and disposed on the display 141.

A convey unit 112 conveys the sheets accommodated in the cassette 111 to the image forming unit 115, the fixing unit 120 and the sheet ejection tray 107 in order according to the instruction of the image forming controller 110.

Figure 6:
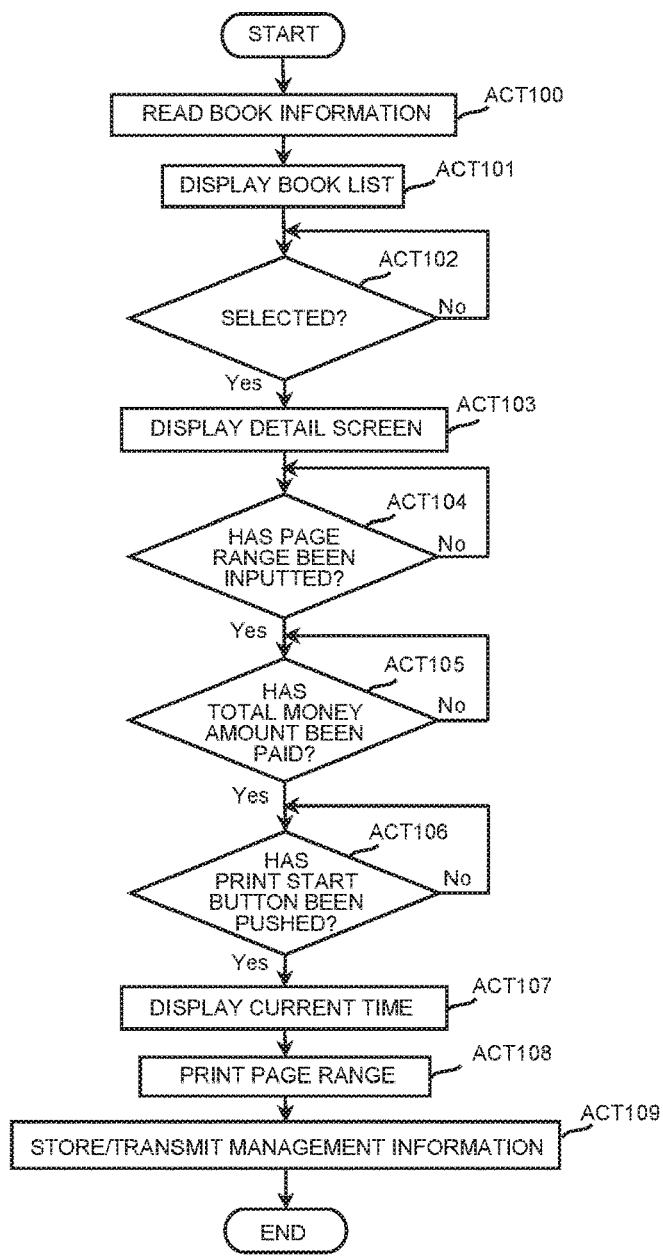
FIG. 6 is a flowchart illustrating rent processing (image formation processing) of the image processing system according to the embodiment.

FIG. 6 is a flowchart illustrating a processing example where the image processing system 1 according to the embodiment rents a book, and is a flowchart mainly illustrating operation control of the PC 102. Further, the processing illustrated in the flowchart in FIG. 6 is realized when the CPU 801 of the PC 102 expands a program stored in the auxiliary storage device 807 to the RAM 802, executes the program to the RAM 802, and collaborates with hardware inside the PC 102 and an external device.

Figure 7:
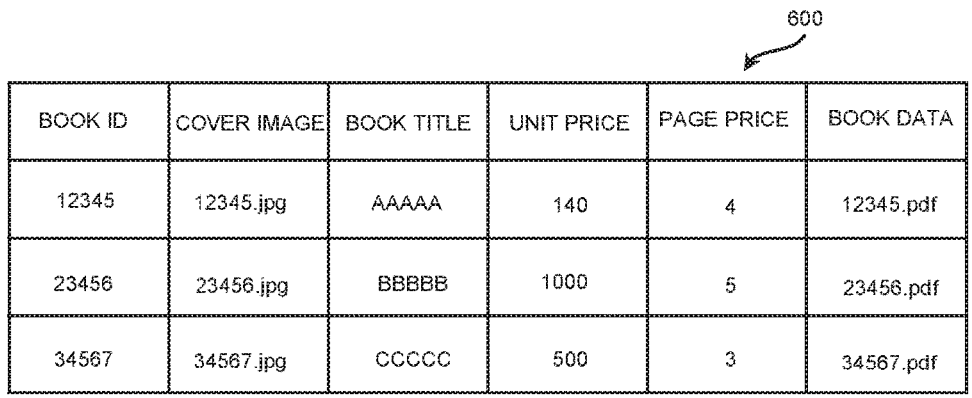
FIG. 7 is a view illustrating an auxiliary storage device which stores book information in the personal computer of the image processing system according to the embodiment.
Figure 8:
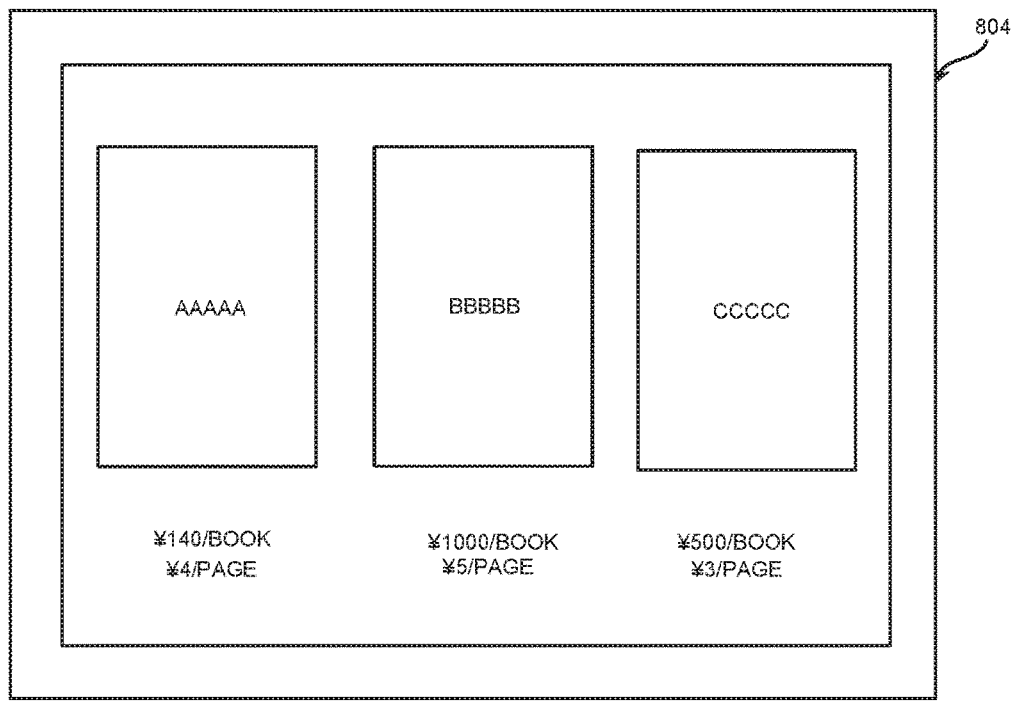
FIG. 8 is a view illustrating an example of a screen of a book list displayed on a touch panel display of a personal computer according to the embodiment.

The CPU 801 of the PC 102 reads book information stored in advance in the auxiliary storage device 807 (ACT 100). The book information will be described with reference to FIG. 7. FIG. 7 is a view illustrating the auxiliary storage device 807 of the PC 102 which stores the book information. Book information 600 is information including identification information (book ID) allocated in advance per book, a cover image file name, a book title, a fee (unit price) per book, a price (page price) per page and a file name including book data (book print data). The auxiliary storage device 807 stores the book information 600 in a table including book IDs, cover image file names, book titles, book unit prices, page prices and each column of book data. The book information 600, the cover images and the book data files may be stored in a file server which is not shown. The CPU 801 obtains the book information 600 illustrated in FIG. 6 from the auxiliary storage device 807, and displays a book list which can be provided to the user on the touch panel display 804 based on this obtained book information 600 (ACT 101). A display screen of this book list will be described with reference to FIG. 8. FIG. 8 is a view illustrating an example of a screen of the book list displayed on the touch panel display 804. As illustrated in FIG. 8, the touch panel display 804 associates and displays per book a book cover image, a fee per book and a price per page.

Figure 9:
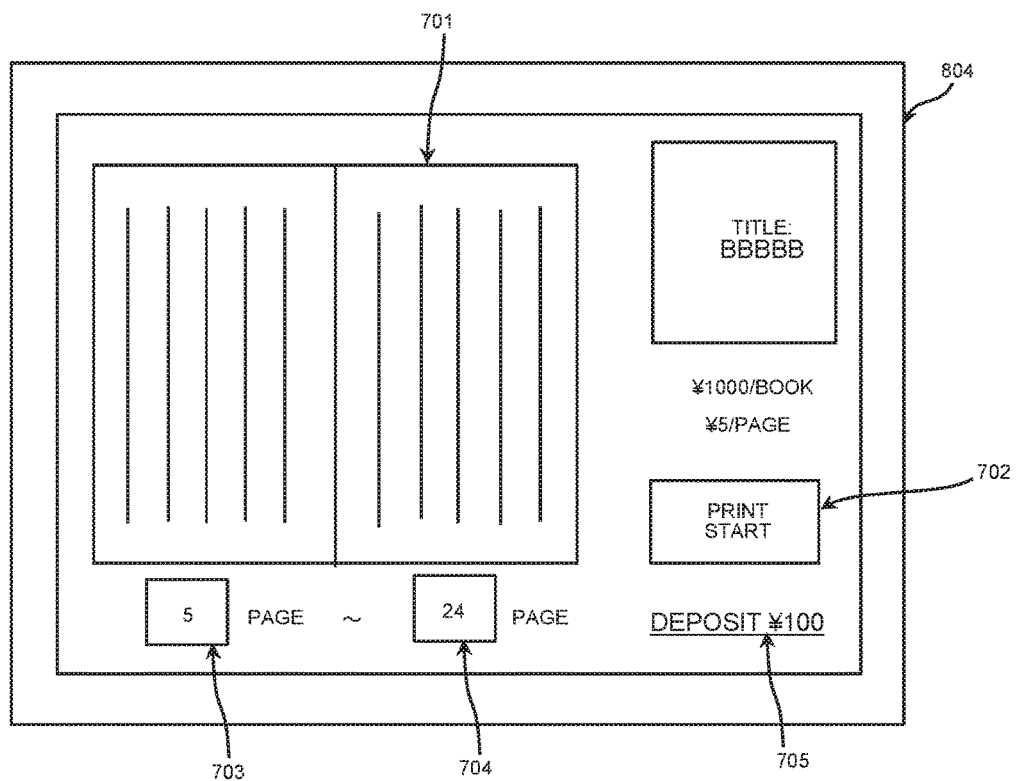
FIG. 9 is a view illustrating an example of a screen of book detail information displayed on the touch panel display of the personal computer according to the embodiment.

The user operates the touch panel display 804 and selects a book which the user desires to print. The CPU 801 determines whether or not the touch panel display 804 has received user's push and selection (ACT 102). When deciding that the touch panel display 804 has received the user's push and selection (ACT 102—Yes), the CPU 801 causes the touch panel display 804 to display book detail information selected by the user (ACT 103). A display screen of this book detail information will be described with reference to FIG. 9. FIG. 9 is a view illustrating an example of a screen of the book detail information displayed on the touch panel display 804. As illustrated in FIG. 9, the screen displayed on the touch panel display 804 includes areas 701, 703, 704 and 705 and a print start button 702. The touch panel display 804 displays a book title or a cover image, a fee per book and a price per page as the book detail information, and displays a preview of each page on the area 701. The area 701 receives a user's flick operation in left and right directions. Images of a previous page and a next page are displayed according to the user's flick operation on the area 701. The user can designate a desired page by touching and selecting the area 703 and the area 704, and inputting numerical values in the area 703 and the area 704. The CPU 801 calculates a deposit by multiplying a price per page (page price) with the number of designated pages (the number of sheets), and displays the deposit on the area 705.

Back to the flowchart in FIG. 6, the CPU 801 determines whether or not a page range has been inputted to the areas 703 and 704 (ACT 104) When deciding that the page range has been inputted in the areas 703 and 704 (ACT 104—Yes), the CPU 801 determines whether or not a total money amount including the deposit has been paid to the billing apparatus 104 (ACT 105). More specifically, the CPU 801 performs decision processing in ACT 105 based on information of a paid money amount transmitted from the billing apparatus 104. In this regard, the card reader/writer may be attached to the PC 102 or a billing operation may be performed by using electronic money by using a non-contact card.

When deciding that the predetermined deposit has been paid (ACT 105—Yes), the CPU 801 determines whether or not the print start button 702 has been pushed (ACT 106). When deciding that the print start button 702 has been pushed (ACT 106—Yes), the CPU 801 obtains current time information from the clock 805 (ACT 107). The current time information is information including a pair of a current date (year/month/day) and a current time (hour/minute/second). The CPU 801 of the PC 102 obtains book print data (book data) of the designated page range from the auxiliary storage device 807. The CPU 801 transmits this obtained book print data to the image forming apparatus 101, and instructs execution of a print job using decoloring toner (ACT 108).

The operation of ACT 108 will be further described in detail. The CPU 801 converts the management information into bar codes, and creates print data to which the bar codes are allocated per sheet.

The management information is management information for renting a book. That is, the management information is information for managing image formation of a book (creation of a printed material of a book) by the image forming unit 115. The management information is referred to when the printed material of the book is returned as described below. The management information includes each of pieces of the following information in the present embodiment.

A job ID for uniquely identifying a print job
A book ID
A print date
A range of page numbers to be printed
A page number on a book (a different value per sheet after printing)

In this regard, as described below, part of each of the pieces of information is stored such that each information can be obtained in a system based on a job ID. Hence, only the pieces of information of the job ID and the page number of the book of the management information may be converted into bar codes. Further, the CPU 801 transmits the print data to which the bar codes have been allocated, to the image forming apparatus 101, and instructs the image forming apparatus 101 to execute the print job. The image forming apparatus 101 receives the print data to which the bar codes have been allocated, and executes the print job.

Figure 10:
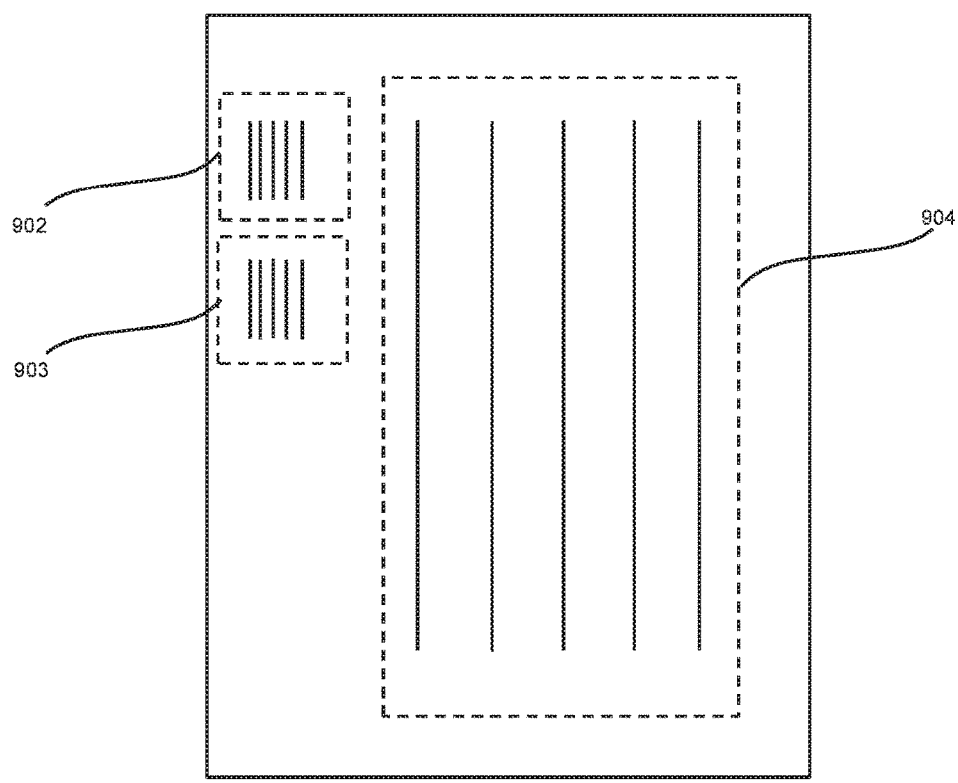
FIG. 10 is a view illustrating an example of a printed material of the image processing system according to the embodiment.

A printed material formed in this way will be described with reference to FIG. 10. FIG. 10 is a view illustrating an example of a sheet of an arbitrary page of the printed material. As illustrated in FIG. 10, the sheet of the page of the printed material includes areas 902, 903 and 904. Book contents (contents) are printed in the area 904, and bar codes indicating the management information are printed in the areas 902 and 903. The bar code indicating, for example, a job ID or a book ID is printed in the area 902. Further, the bar code indicating a print date, a range of page numbers and a page number of a sheet of a book is printed in an area 903. In this regard, the bar codes according to the present embodiment may be one-dimensional bar codes or two-dimensional bar codes.

Back to explanation of FIG. 6, the CPU 801 causes the auxiliary storage device 807 to store part or all of the pieces of management information, and transmits the management information to the decoloring apparatus 100 (ACT 109). When receiving the management information, the decoloring apparatus 100 stores this received management information in the auxiliary storage device 305.

Figure 11:
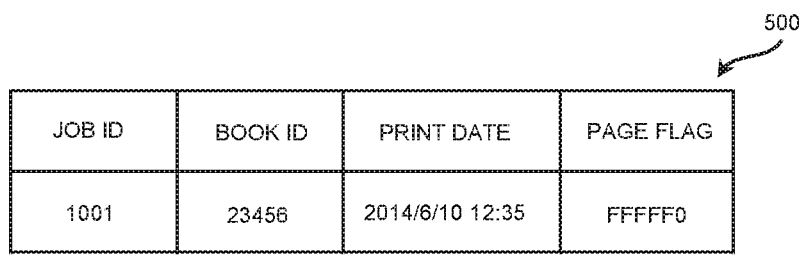
FIG. 11 is a view illustrating the auxiliary storage device which stores management information in the personal computer according to the embodiment.

The management information stored in the auxiliary storage device 807 and transmitted to the decoloring apparatus 100 will be described with reference to FIG. 11. FIG. 11 is a view illustrating the management information stored in the auxiliary storage device 807. The management information 500 includes information of each item including at least a job ID, a book ID, a print date, and a page flag indicating a print range. As illustrated in FIG. 11, the auxiliary storage device 807 stores information of the job ID, the book ID, the print date and the page flag indicating the print range as the management information per item. A value of each of these items matches with each information converted into the bar code. The PC 102 and the decoloring apparatus 100 store the management information illustrated in FIG. 11 as one record. In this regard, the page flag illustrated in FIG. 11 is expressed as a hexadecimal, and each digit obtained by converting this hexadecimal into a binary corresponds to each page number of a book. Further, a numerical value 1 converted into the binary indicates a currently printed page, and a numerical value 0 (zero) indicates a page which is not printed.

Figure 12:
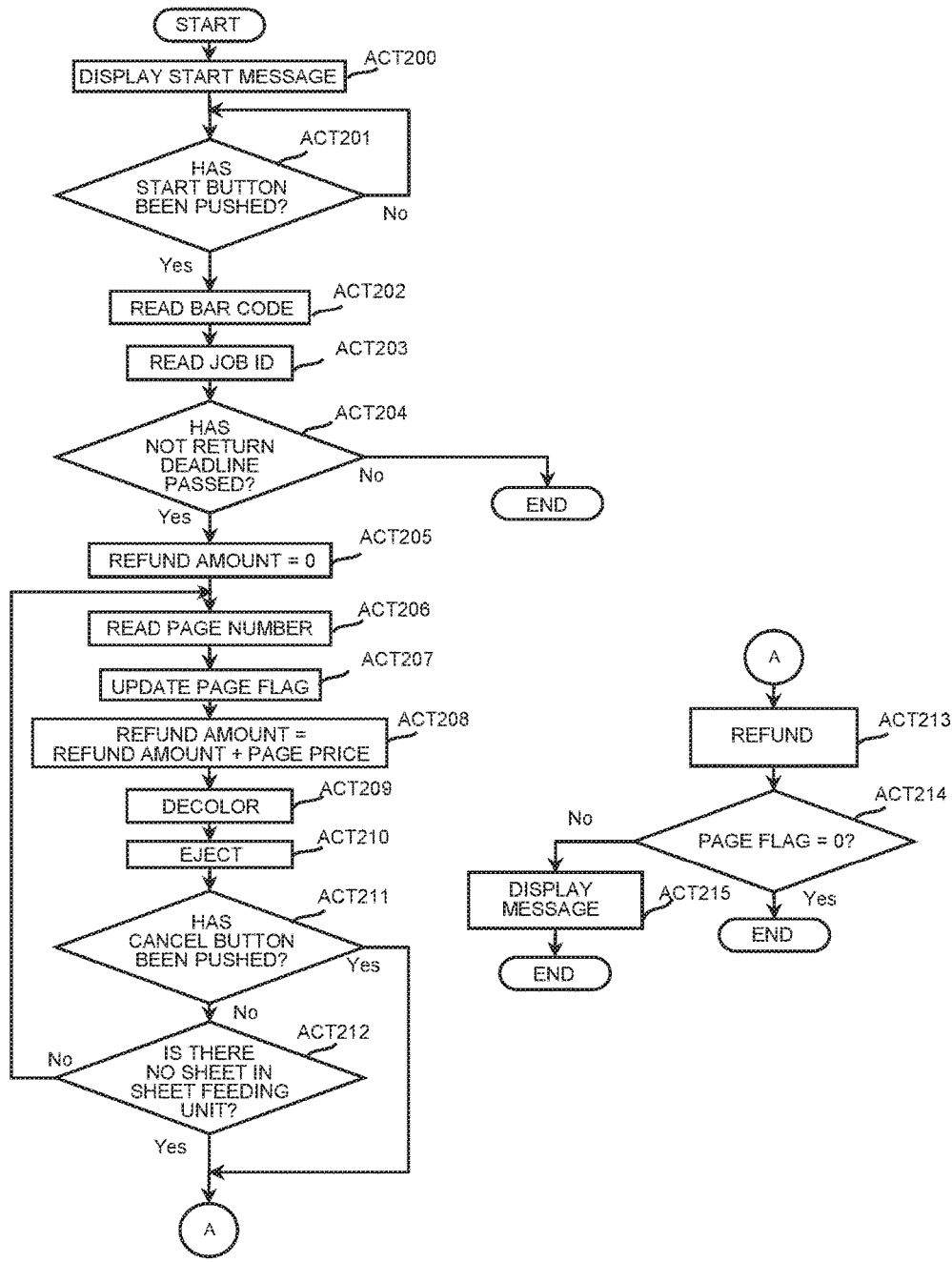
FIG. 12 is a flowchart illustrating return processing (decolor processing) of the image processing system according to the embodiment.

FIG. 12 is a flowchart illustrating a processing example where the image processing system 1 according to the embodiment returns a printed material of a book, and mainly illustrates an operation of the decoloring apparatus 100. The processing illustrated in the flowchart in FIG. 12 is realized when the controller 201 (CPU 301) of the decoloring apparatus 100 expands a program stored in the auxiliary storage device 305 to the RAM 302, executes the program, and collaborates with hardware inside the decoloring apparatus 100 and an external device. In this regard, the PC 102 may perform part of the processing illustrated in FIG. 12 (e.g., display processing, reception of an operation input, an arithmetic operation and decision processing).

Figure 13:
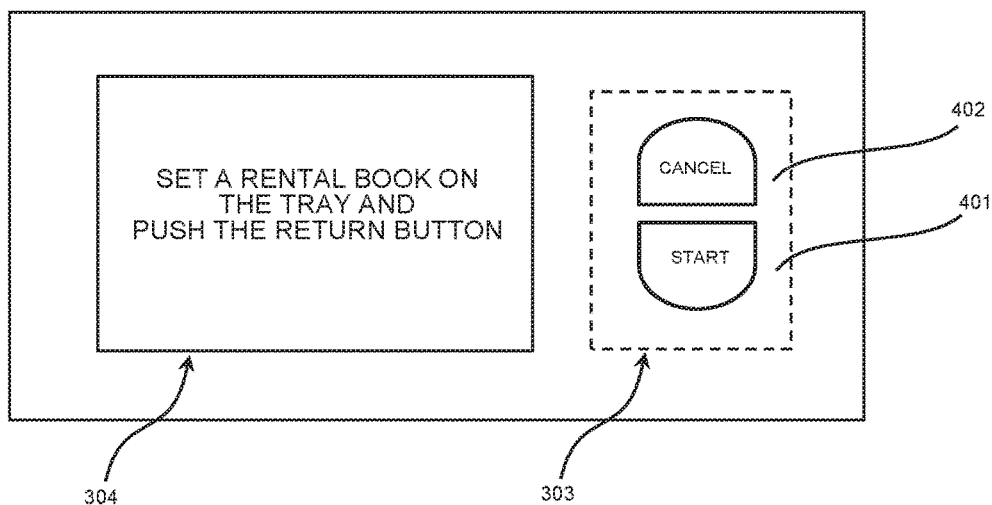
FIG. 13 is a view illustrating an example of a screen displayed on a display of the decoloring apparatus according to the embodiment when return starts.

The controller 201 (CPU 301) causes the display 304 to display a start message (ACT 200). Next, the CPU 301 determines whether or not the start button of the operation panel 303 has been pushed (ACT 201). A display screen of the start message displayed on the display 304 will be described with reference to FIG. 13. FIG. 13 is a view illustrating an example of the display screen (a screen example where return starts) of the start message displayed on the display 304. The display 304 sets a printed material to be returned to the user, to the sheet feeding unit 202 and displays a message for encouraging the user to push the start button. The display 304 displays a message such as "set a rental book on the tray and push the return start button". Further, the operation panel 303 includes a start button 401 for starting return processing and a cancel button 402 for canceling this return processing, and receives a user's button operation.

When deciding that the start button of the operation panel 303 has been pushed (ACT 201—Yes), the CPU 301 causes the driving unit 310 to convey the sheets in the sheet feeding unit 202 one by one to the reading unit 205. The CPU 301 causes the reading unit 205 to operate and obtain image data of bar codes printed in the areas 902 and 903 (ACT 202).

The CPU 301 converts the image data of the bar codes printed in the areas 902 and 903 into the management information, and obtains the job ID (ACT 203). The CPU 301 extracts the information of the print date associated with the obtained job ID from management information 500 (the management information received from the PC 102) stored in the auxiliary storage device 305. In this regard, this information of the print date may be directly read from the bar code printed in the area 903.

The CPU 301 determines whether or not a return deadline determined in advance has passed (ACT 204) That is, in ACT 204, the CPU 301 executes the decision processing in the following order.

1. A predetermined period (e.g., one week) is added to the obtained information of the print date.
2. Whether or not this date after addition has passed a current date.

When deciding that the predetermined return deadline has passed (ACT 204—No), the CPU 301 ejects the sheets to the sheet ejection unit 207 without performing decolor processing and finishes the processing in the present embodiment. That is, the deposit is not returned to the user, and the user gets the printed material of the book. Thus, in the present embodiment, the user is permitted to finally possess the printed material of the book.

When deciding that the predetermined return deadline does not pass (ACT 204—Yes), the CPU 301 initializes a variable value (referred to simply as a refund amount) indicating a refund amount to 0 (zero) (ACT 205), and then obtains a page number of the book which is a read value of the bar code printed in the area 903 (ACT 206).

The CPU 301 extracts a value of a page flag from the management information 500 stored in the auxiliary storage device 305, and rewrites a bit value corresponding to a currently processed page number from 1 to 0 (ACT 207). Further, the CPU 301 calculates a value obtained by adding a page price to a current refund amount as a new refund amount (ACT 208).

The CPU 301 causes the image decoloring unit 206 to operate and heat a processing target sheet to be conveyed, at a predetermined decoloring temperature or more to perform decolor of the sheet (ACT 209). The decolored sheet is ejected to the sheet ejection unit 207 (ACT 210).

The CPU 301 determines whether or not the cancel button 402 has been pushed (ACT 211). When deciding that the cancel button 402 has been pushed (ACT 211—Yes), the CPU 301 moves to processing in ACT 213. When deciding that the cancel button 402 has not been pushed (ACT 211—Yes), the CPU 301 determines whether or not there is no sheet in the sheet feeding unit 202 based on an output signal from the sensor 208 (ACT 212). The CPU 301 determines whether or not all sheets stacked in the sheet feeding unit 202 are decolored by the processing in ACT 212. When deciding that there is a remaining sheet in the sheet feeding unit 202 (ACT 212—No), the CPU 301 returns to the processing in ACT 206. When deciding that there is no remaining sheet in the sheet feeding unit 202 (ACT 212—Yes), the CPU 301 controls the billing apparatus 104 to refund the final refund amount (ACT 213). Thus, the billing apparatus 104 withdraws the instructed money amount to refund to the user.

Figure 14:
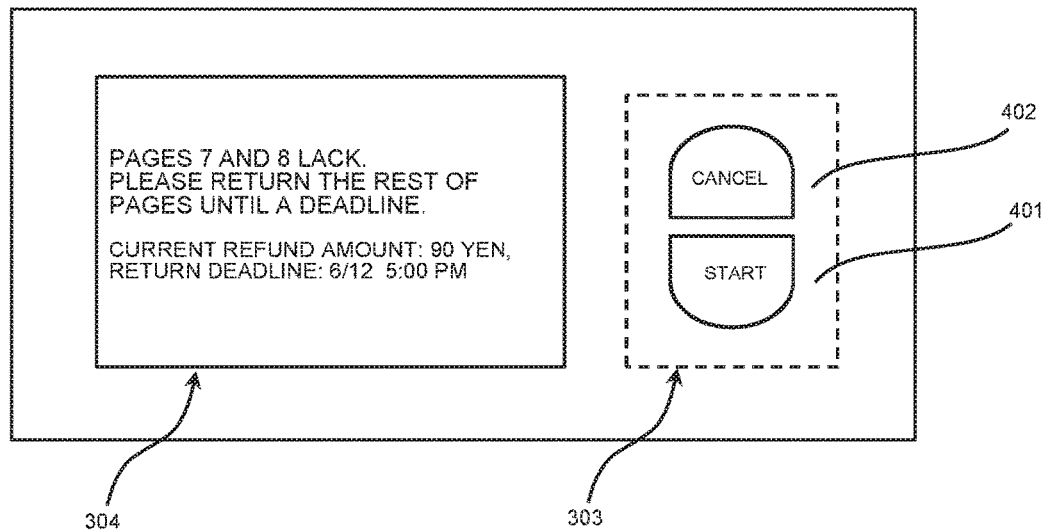
FIG. 14 is a view illustrating an example of a screen displayed on the display of the decoloring apparatus according to the embodiment when pages of a returned printed material lack.

The CPU 301 determines whether or not all bit values of the page flags have become 0 (zero) (ACT 214). When deciding that all bit values of the page flags have become (zero), i.e., when deciding that a printed material of all pages is returned and is decolored (ACT 214—Yes), the CPU 301 finishes the processing. Meanwhile, when deciding that all bit values of the page flags are not 0 (zero) (ACT 214—No), the CPU 301 causes the display 304 to display a message (ACT 215). An example of the display screen of the display 304 in this case will be described with reference to FIG. 14. FIG. 14 is a view illustrating the example of a screen displayed on the display 304 when pages of a returned printed material lack. In the present embodiment, the display 304 displays lacking page numbers, a current refund amount, and a message for notifying the user of a return deadline. The display 304 displays a message such as "pages 7 and 8 lack. Please return the rest of pages until a deadline. Current refund amount: 90 yen, return deadline: 6/12 5:00 PM".

Further, the current processing updates page flags. Therefore, the CPU 301 may perform control to synchronize the management information of the auxiliary storage device 305 and the management information stored in the auxiliary storage device 807 of the PC 102, i.e., to set both pieces of the management information to the same value. Further, the CPU 301 may leave the management information to accumulate the management information as a history.

In this regard, a refund money amount operation may be performed by a procedure using electronic money by using the card reading unit 209.

In the above embodiment, when the sheets of the printed material of all pages are returned, the entire deposit is returned. However, the entire deposit may not be returned, and the money amount corresponding to a rental period of the printed material may be refunded.

The image processing system according to the embodiment is a system in which a plurality of apparatuses of different housings collaborates. However, the embodiment is not limited to this. In the embodiment, the image processing system may be, for example, a system in which a plurality of apparatuses provided in one housing collaborates. Further, associations between each function and the housing are not limited to the above embodiment. For example, the image formation processing and the decolor processing may be realized by the apparatuses provided in one housing.

Further, the image decoloring unit of the decoloring apparatus according to the embodiment decolors images by heating the images. However, the embodiment is not limited to this. For example, the image decoloring unit may decolor images by irradiating the images with light and erasing the images. A decolorable coloring material in this case is a photodecomposite coloring material which is decomposed by being irradiated with light such as near infrared ray. Further, the image decoloring unit may decolor images by peeling images from sheets by chemical processing. In this case, as a decolorable coloring material, a coloring material which peels images from sheets by, for example, dipping the images in a processing solution.

Items of contents of books and the like which are authorized by authors of the books, related organizations or related groups are used. Further, the money amounts are determined by councils of copyright owners, the related organizations and the related groups. Furthermore, when a book is printed, the display displays terms of use and prohibitions based on the copyright act stipulated in each country.

In this regard, books according to the present embodiment include printed materials such as newspapers, magazines and brochures. Further, the books according to the present embodiment include printed materials published as articles not for sale.

The embodiment is realized according to a copyright act and other laws stipulated in each country.

In the present embodiment, the programs which realize the functions are recorded inside the apparatus. However, the present embodiment is not limited to this, and the programs which realize the same functions may be downloaded from a network to the apparatus. Further, the programs which realize the same functions stored in recording media may be installed in the apparatus. The recording media may be any mode as long the recording media such as CR-ROMs can store programs and can be read by the apparatus. Further, the programs obtained by being installed in advance or downloaded as described above may realize the functions according to the present embodiment in collaboration with an OS (Operating System) inside the apparatus.

As described above in detail, according to the present embodiment, it is possible to prevent external leakage of the printed material by decoloring contents and information of a printed material of a rental book, and reuse sheets.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system comprising:
   an image forming unit configured to form an image on a sheet using a decolorable coloring material;
   an image decoloring unit configured to decolor the image formed by the image forming unit;
   a storage device that stores book information including print data of a book;
   an operation panel configured to receive
      designation of the book for printing one or more images of pages of the book on one or more sheets, and
      an operation for decoloring one or more of the images printed on the sheets set on a tray; and
   a processor configured to
      in response to the designation of the book, obtain the print data of the designated book from the storage device, and control the image forming unit to form the images of the designated book based on the obtained print data, and
      in response to the operation for decoloring the images, control the image decoloring unit to decolor the images printed on the sheets set on the tray, and determine whether or not all images of the designated book have been decolored within a predetermined period after the images are formed by the image forming unit.

2. The image processing system according to claim 1, further comprising:
   a billing apparatus configured to receive payment of a predetermined fee for image formation of the book,
   wherein the processor is configured to
      determine whether or not the predetermined fee has been paid to the billing apparatus, and
      control the image forming unit to execute the image formation of the book when determining that the predetermined fee has been paid to the billing apparatus.

3. The image processing system according to claim 2, wherein
   the storage device stores book information including print data of a plurality of books,
   the book information includes information about the predetermined fee for the image formation of each of the plurality of books, and the processor is configured to determine whether or not the predetermined fee has been paid to the billing apparatus for the image formation of each book based on the book information.

4. The image processing system according to claim 2, wherein the processor is configured to
   determine a number of pages of the images of the book decolored by the image decoloring unit, and
   control the billing apparatus to refund a portion of the predetermined fee corresponding to the determined number of pages.

5. The image processing system according to claim 4, wherein
   the book information includes information about a fee per page unit of the book, and
   the processor is configured to calculate the fee to be refunded based on the fee per page unit included in the book information and the determined number of pages.

6. The image processing system according to claim 4, wherein
   the operation panel includes a display, and
   the processor is configured to control the display to display one or more page numbers of the pages in which the images have not been decolored by the image decoloring unit.

7. The image processing system according to claim 4, wherein the processor is configured to
   determine whether or not the predetermined period has passed, and
   control the billing apparatus not to refund any of the predetermined fee when determining that the predetermined period has passed.

8. The image processing system according to claim 1, wherein the processor is configured to:
   generate management information for managing image formation of the book by the image forming unit,
   control the image forming unit to form the image including the management information on the sheet by adding the management information to the obtained print data of the book, and
   determine based on the management information whether or not all images have been decolored within the predetermined period.

9. The image processing system according to claim 8, further comprising:
   a scanner configured to scan the sheets set on the tray and read image data,
   wherein the processor is configured to determine one or more of the pages of the images which have not been decolored by the image decoloring unit based on the management information included in the image data.

10. The image processing system according to claim 1, further comprising:
    a convey unit configured to convey the sheets set on the tray to the image decoloring unit, wherein
    the processor is configured to
      determine whether or not the predetermined period has passed, and
      when the predetermined period has passed, control the convey unit to eject the sheets without decoloring by the image decoloring unit.

11. An image processing method carried out by an image processing system, the method comprising:
    storing in a storage device book information including print data of a book which can be printed by an image forming unit;
    receiving, via an operation panel, designation of a book for printing one or more images of pages of the book on one or more sheets;
    in response to the designation of the book, obtaining the print data of the designated book from the storage device, and forming the images of the designated book based on the obtained print data with an image forming unit using a decolorable coloring material;
    receiving, via the operation panel, an operation for decoloring one or more of the images printed on the sheets set on a tray; and
    in response to the operation for decoloring the images, decoloring the images printed on the sheets set on the tray with an image decoloring unit, and determining whether or not all images of the designated book have been decolored within a predetermined period after the images are formed by the image forming unit.

12. The image processing method according to claim 11, further comprising:
    receiving payment of a predetermined fee for image formation of the book with a billing apparatus;
    determining whether or not the predetermined fee has been paid to the billing apparatus; and
    executing the image formation of the book with the image forming unit when the predetermined fee has been paid to the billing apparatus.

13. The image processing method according to claim 12, wherein
    the storage device stores book information including print data of a plurality of books,
    the book information includes information about the predetermined fee for the image formation of each of the plurality of books, and
    the image processing method comprises determining whether or not the predetermined fee has been paid to the billing apparatus for the image formation of each book based on the book information.

14. The image processing method according to claim 12, further comprising:
    determining a number of pages of the images of the book decolored by the image decoloring unit, and
    refunding a portion of the predetermined fee corresponding to the determined number of pages with the billing apparatus.

15. The image processing method according to claim 14, wherein
    the book information includes information about a fee per page unit of the book, and
    the image processing method comprises calculating the fee to be refunded based on the fee per page unit included in the book information and the determined number of pages.

16. The image processing method according to claim 14, further comprising:
    displaying on a display of the operation panel one or more page numbers of the pages in which the images have not been decolored by the image decoloring unit.

17. The image processing method according to claim 14, further comprising:
    determining whether or not the predetermined period has passed, wherein the predetermined fee is not refunded when the predetermined period has passed.

18. The image processing method according to claim 11, further comprising:
    generating management information for managing image formation of the book by the image forming unit, forming, with the image forming unit, the image including the management information on the sheet by adding the management information to the obtained print data of the book, and determining, based on the management information, whether or not all images have been decolored within the predetermined period.

19. The image processing method according to claim 18, further comprising:

scanning, with a scanner, the sheets set on the tray and read image data, and determining, based on the management information included in the image data, one or more of the pages of the images which have not been decolored by the image decoloring unit.

20. The image processing method according to claim 11, further comprising:

determining whether or not the predetermined period has passed, conveying the sheets set on the tray to the image decoloring unit with a convey unit, and when the predetermined period has passed, ejecting the sheets without decoloring by the image decoloring unit.

* * * * *